W. R. GILMORE.
SPRING WHEEL.
APPLICATION FILED FEB. 10, 1914.

1,156,771.

Patented Oct. 12, 1915.

Inventor
W. R. Gilmore.

By Victor J. Evans
Attorney

Witnesses
Frederick H Saylor
V. B. Hillyard.

UNITED STATES PATENT OFFICE.

WILLIAM R. GILMORE, OF RICHMOND, CALIFORNIA.

SPRING-WHEEL.

1,156,771.  Specification of Letters Patent.  Patented Oct. 12, 1915.

Application filed February 10, 1914.  Serial No. 817,858.

*To all whom it may concern:*

Be it known that I, WILLIAM R. GILMORE, a citizen of the United States, residing at Richmond, in the county of Contra Costa and State of California, have invented new and useful Improvements in Spring-Wheels, of which the following is a specification.

The invention relates to vehicle wheels of the type embodying inner and outer portions between which a cushioning means is interposed to provide for the neutralization of vibration and shock whereby riding is rendered more comfortable and the wear and tear upon the running gear and vehicle materially diminished.

The invention provides a wheel of the type hereinbefore stated which is particularly adapted for use as a driver upon motor vehicles, said wheel having the driving power applied directly to the outer portion, thereby preventing any slipping and insuring positive traction between the tread of the wheel and the surface.

The invention consists of the novel features, details of construction and combination of parts, which hereinafter will be more particularly set forth, illustrated in the accompanying drawings, and pointed out in the appended claims.

Figure 1:
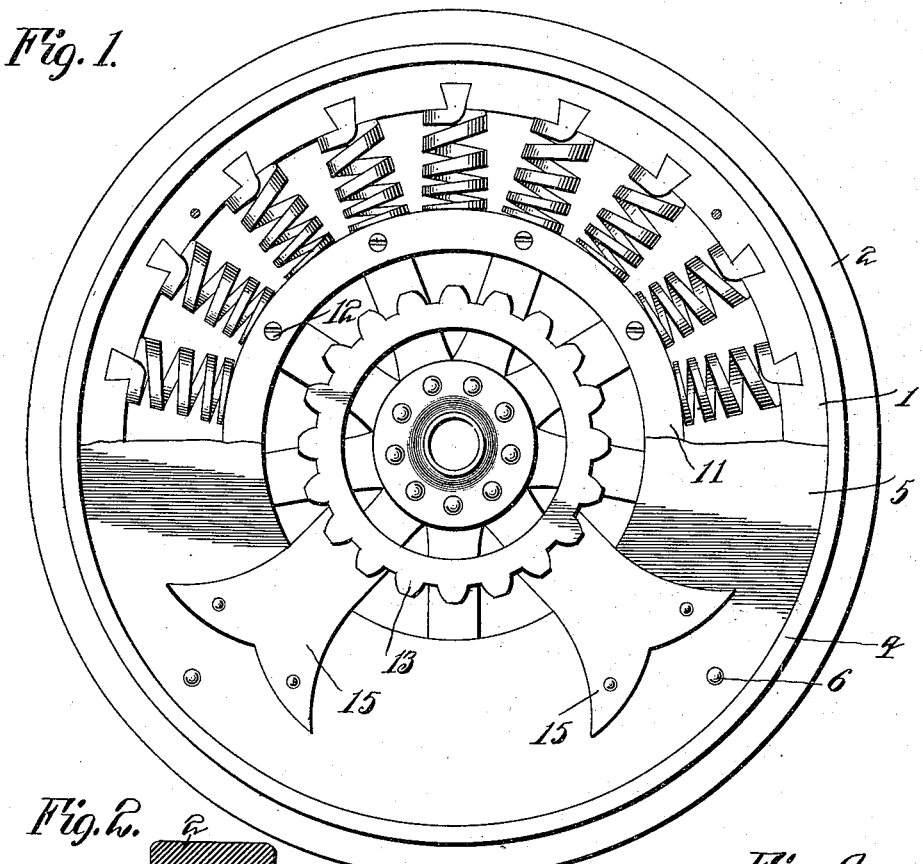
Figure 2:
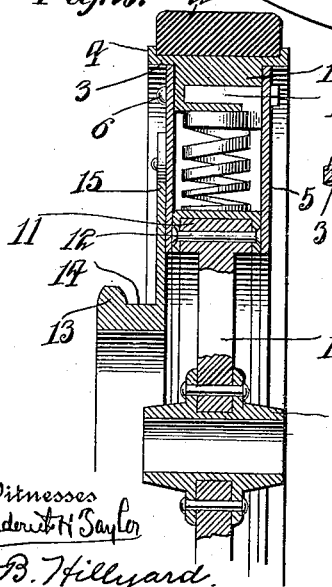
Figure 3:
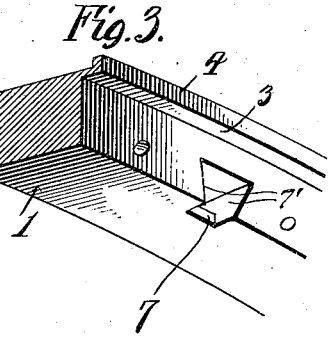
Figure 4:
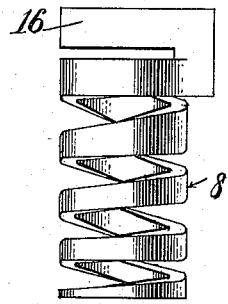

Referring to the drawings, forming a part of the specification, Figure 1 is a side view of a spring wheel embodying the invention, parts being broken away. Fig. 2 is a transverse section of a portion of the wheel. Fig. 3 is a perspective view of a portion of the felly. Fig. 4 is an elevation of one of the cushioning springs.

Corresponding and like parts are referred to in the following description, and indicated in all the views of the drawing, by the same reference characters.

The wheel comprises inner and outer parts the latter embodying a rim and side pieces, said side pieces being parallel and having their center portion cut away to expose the hub portions of the inner part and provide for ample movement of the axle. The rim may be of any construction and comprises a felly 1 and tire 2. The felly 1 is provided at opposite sides with lateral flanges or extensions 3 and outer flanges 4. The lateral flanges or extensions 3 provide an extended seat for the tire 2 and the latter is retained in place by means of the outer flanges 4. The side pieces 5 are secured at their outer edges to the felly 1 by fastenings 6 which pass through registering openings formed in the felly and side pieces. The lateral flanges or extensions 3 project beyond the side pieces 5 and form protecting means for the ends of the fastenings 6 to prevent the same from coming in contact with an object. A plurality of L-shaped sockets 7, said sockets having inclined side walls 7', the said L-shaped socket being formed transversely in the felly 1 and receiving the outer ends of cushioning springs 8 which are interposed between the inner and outer parts of the wheel.

The inner part of the wheel comprises a hub 9 spokes 10 and a rim 11 the latter having the outer ends of the spokes 10 connected thereto in any convenient and substantial manner. The rim 11 is hollow or substantially of channel shape in cross section and is arranged with the hollow side facing inward to receive the outward ends of the spokes 10 which are enlarged, such spokes being secured to the rim by means of fastenings 12 which pass through openings formed in the side wings of the rim and in the heads of the spokes 10 in coincident relation. The outer faces or sides of the rim 11 are in parallel planes and touch the inner sides of the parts 5. When the wheel is in operation the center part receives an eccentric movement which is due to the constant change of the load point. A gear wheel 13 of any design or variety is connected with one of the side pieces 5 and admits of the driving force being applied directly to the outer portion of the wheel which is essential to prevent slipping and insure positive traction between the surface and the tread of the wheel when the latter is used as a driver for propelling a motor vehicle. The gear wheel has a portion 14 which is adapted to coöperate with either a brake shoe or brake band so that the speed of the vehicle embodying the invention may be retarded when required. The gear wheel is shown as provided with arms 15 which overlap one of the side pieces 5 and are bolted or otherwise secured thereto.

Cushioning means are interposed between the inner and outer parts of the wheel to admit of the outer part moving under stress of the load so as to compensate for shock and vibration. The cushioning means may be of any variety commonly embodied in spring wheels of this type to which the present invention belongs. In the preferred construction the cushioning means consists of a plurality of helical springs 8 which are interposed between the rims of the inner and outer parts of the wheel and the said springs being of such strength as to sustain the load and stress. It is preferred to have the helical springs 8 arranged radially with their inner ends seated upon the rim 11 and their outer ends secured to the felly 1. For this purpose each of the springs 8 has an end portion 16 bent to extend diametrically across the spring so as to enter one of the sockets 7 thereby clamping a portion of the felly between the spring and the bent end 16 thereof. This manner of attachment holds the springs fixed with reference to the rim of the wheel but admits of the inner ends of the springs having a relative movement upon the rim 11 whereby the inner and outer parts of the wheel may move relatively without causing any strain of the springs by moving the same out of radial position. Each of the springs 8 is formed from a blank which tapers throughout its length, whereby the volutes gradually diminish in strength from the base to the inner terminal of the spring. The springs as shown are arranged with their heavier ends facing outward and their lighter ends facing inward, such arrangement having been found to give the best result. As indicated most clearly in Figs. 1 and 3 the sockets 7 are of wedge form in cross section and the bent ends 16 of the springs are of a corresponding shape thereby insuring a close fit and preventing any play between the springs and the rim of the outer part of the wheel. The openings of the sockets 7 are closed by one of the side pieces 5 as indicated most clearly in Fig. 2 thereby holding the bent ends of the spring in such sockets.

The invention is of a nature to enable any make or style of wheel to be readily converted into one having a yieldable tread. In the event of converting a wheel having a pneumatic into one provided with a spring rim in accordance with this invention it is only necessary to omit the pneumatic tire and their adjunctive parts and to place the outer portion in position, such outer portion embodying the felly 1 and side pieces 5 after which the cushioning springs 8 may be placed between the rims of the inner and outer parts of the wheel. It is also understood that a wheel having a wooden felly may be readily converted into a spring wheel in accordance with this invention. This is readily suggested from Fig. 2. The side pieces 5 besides serving to prevent lateral movement of the two parts of the wheel also close the space between the two rims thereby preventing the entrance of foreign matter which would tend to interfere with the free movement of the outer part of the wheel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a spring wheel, the combination of inner and outer parts, one of such parts having laterally extending L-shaped sockets, and cushioning springs interposed between the two parts, each of said springs having its upper end bent to conform with the socket and extending diametrically across the top of the spring and loosely mounted within the socket, and means over the entrance of the socket and contacting with a portion of the upper end of said spring for preventing any accidental displacement of the latter from said socket.

In testimony whereof I affix my signature in presence of two witnesses.

WILLIAM R. GILMORE.

Witnesses:
C. L. STRINGER,
W. H. MALLORY.